June 22, 1965    C. H. DUFRESNE    3,190,384
ENDLESS FULL TRACK TRACTOR AND CONTROL DEVICES
Filed Jan. 15, 1964    3 Sheets-Sheet 1
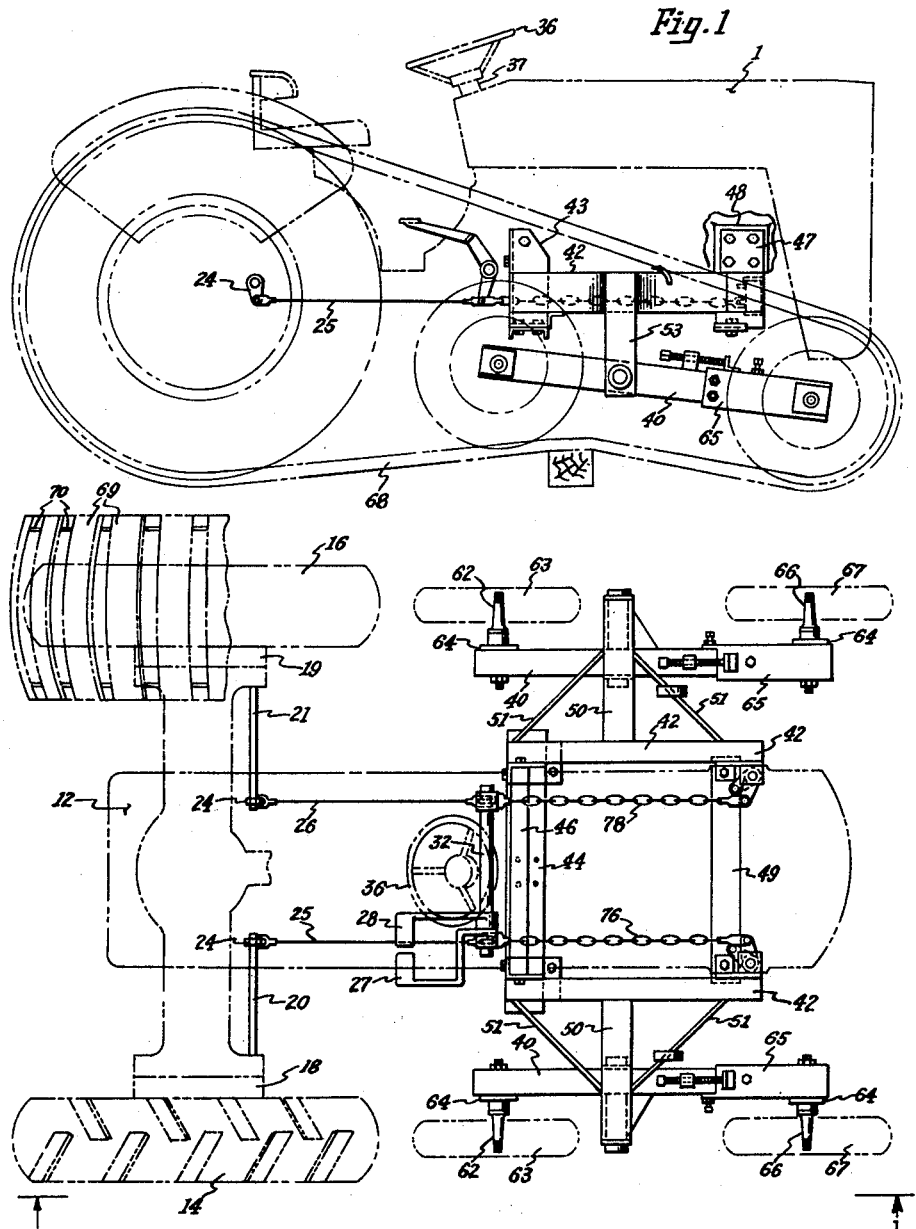
INVENTOR
CONRAD H. DUFRESNE
BY Virgil C. Kline
ATTORNEY June 22, 1965 C. H. DUFRESNE 3,190,384
ENDLESS FULL TRACK TRACTOR AND CONTROL DEVICES
Filed Jan. 15, 1964 3 Sheets-Sheet 2

INVENTOR
CONRAD H. DUFRESNE
BY Virgil C. Kline
ATTORNEY

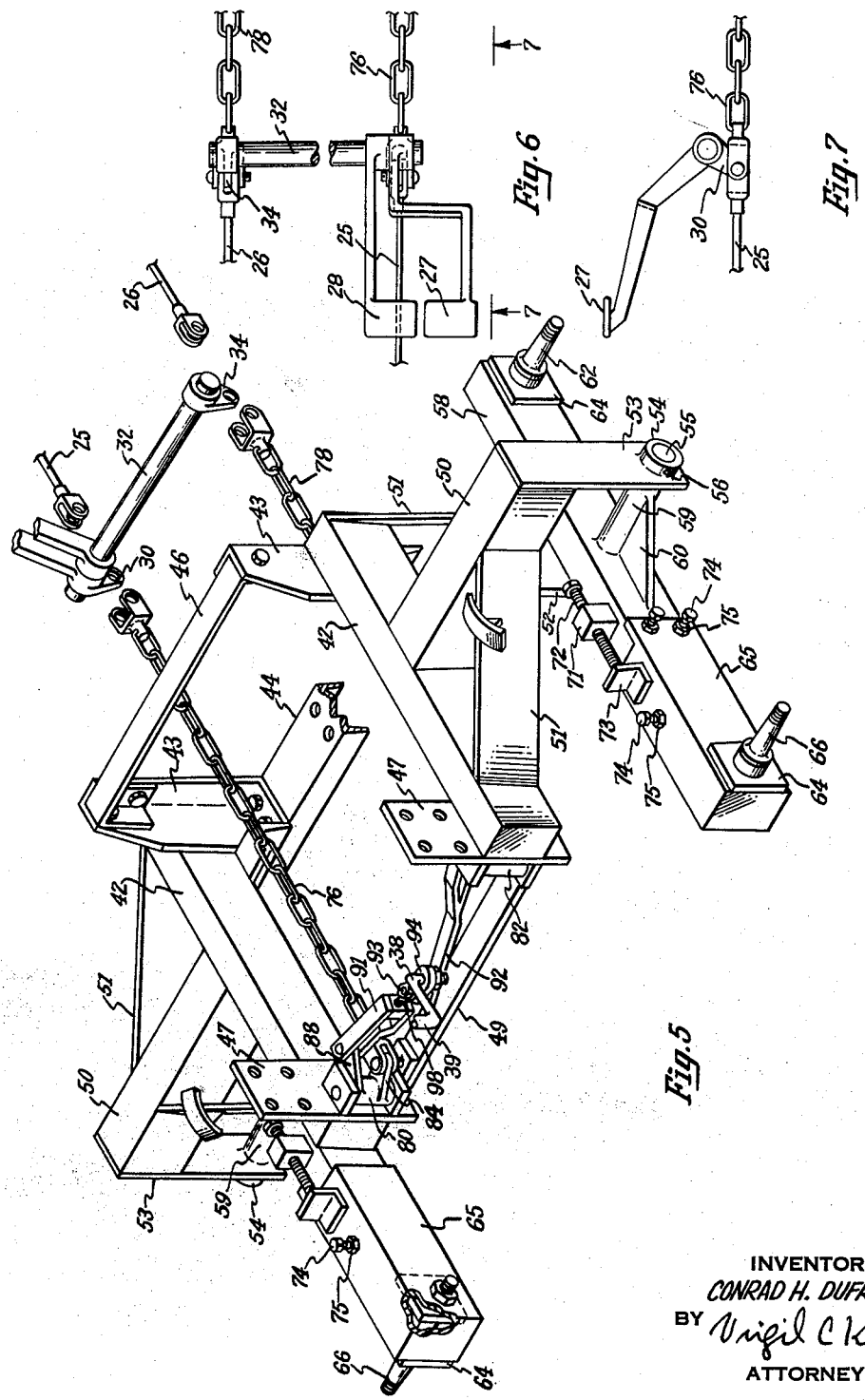

3,190,384
ENDLESS FULL TRACK TRACTOR AND
CONTROL DEVICES
Conrad H. Dufresne, Merchant St. Extension, Barre, Vt.
Filed Jan. 15, 1964, Ser. No. 337,808
7 Claims. (Cl. 180—6.7)

This invention relates to a tractor, preferably converted from the usual four wheel tractor having front steering wheels and rear driving wheels. In the present invention there is provided a special rigid front supporting frame structure, preferably having two supporting wheels on each side of the tractor, hinged for vertical rocking movement but aligned on each side of the tractor with each other and with the corresponding driving wheel, for support of the flexible outer endless tracks on which the tractor travels.

The forward supporting wheel structure is especially made for rugged strength, extensive vertical movement of any of the supporting wheels when obstacles are encountered in the path of the vehicle and for effective safe support and steering of the tractor while in motion through the power actuated driving mechanism associated with the rear wheels.

The above and other objects will be clear from the following description when considered in connection with the drawings wherein:

FIG. 1 is an elevational view of the tractor for general illustration thereof.

FIG. 2 is a similar plan view.

FIG. 5 is an enlarged perspective view of the front supporting structures and the control devices carried thereby.

FIGS. 6 and 7 are detailed views, in plan and elevation respectively, of the brake control devices employed herein.

Figure 3:
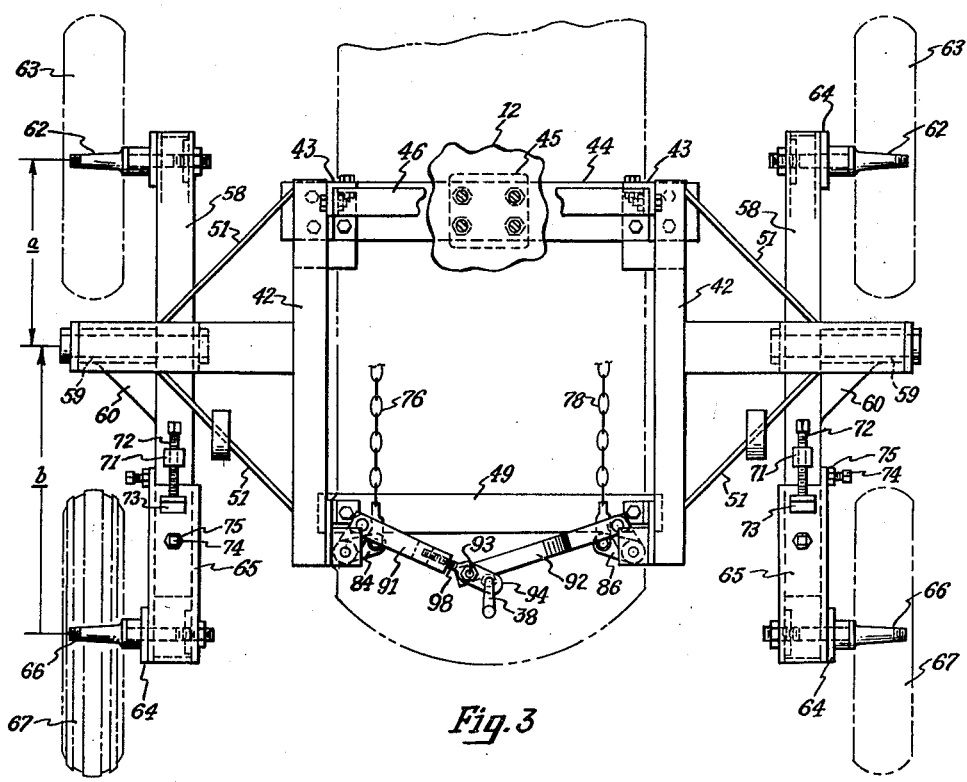
FIG. 3 is a plan view of the forward supporting structure for the tractor herein disclosed.
Figure 4:
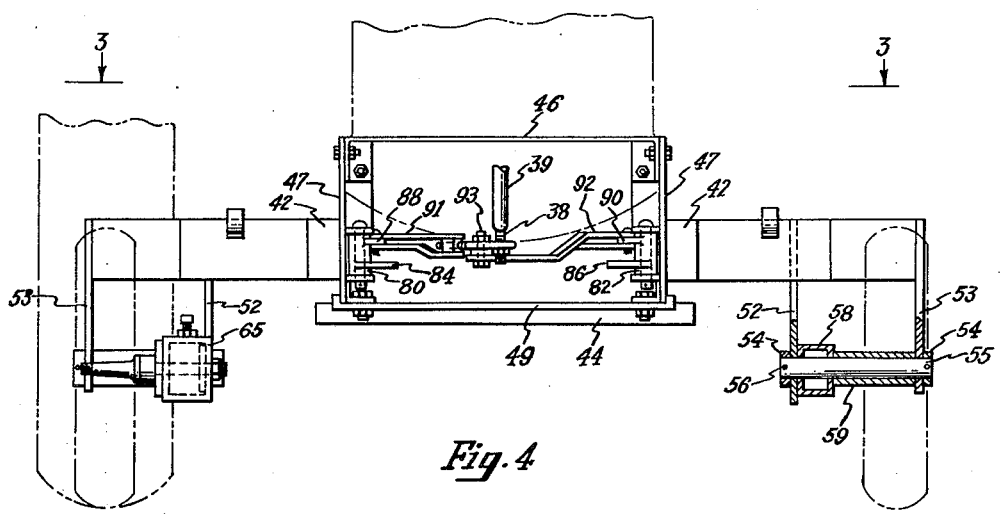
FIG. 4 is a front elevational view thereof, parts being in section.

Referring to the drawings, the tractor 10 includes a supporting frame 12 and rear driving wheels 14 and 16 connected through customary differential driving mechanism with the power unit 17, all securely mounted on the frame 12 and supported rearwardly by the driving wheels 14 and 16.

The individually actuated brakes for each rear wheel mounted in casings 18 and 19 are shown as actuated at each side of the tractor by rotation of transverse brake shafts 20 and 21 having downwardly projecting operating levers 24 mounted firmly on shafts 20 and 21 and pivotally connected to longitudinal brake rods 25 and 26 extending forwardly to the brake actuating mechanism. Forward movement of either of the rods 25 or 26 thus applies the corresponding brakes. Brake pedals 27 and 28 are shown as arranged side by side adjacent and to the right of the operator's seat on the tractor for either individual or combined application of the brakes. Brake pedal 27, mounted for free rocking motion on transverse shaft 32, is formed with a downwardly extending actuating arm 30, the lower free end of which is hingedly connected to the forward end of brake rod 25. Brake pedal 28 is firmly mounted on and supported by transverse rocking shaft 32 extending to the left across the tractor frame to a position adjacent the forward end of brake rod 26. Shaft 32 carries a downwardly extending actuating arm 34, similar to the arm 30, firmly secured to shaft 32 and pivotally connected at its free end to the forward end of brake rod 26. The right brake at 18 is thus applied by downward movement of the right foot pedal 27, the left brake at 19 being applied in the same manner by the left foot pedal 28.

The steering mechanism on the tractor remains unchanged from the manually controlled steering wheel 36, carried by shaft 37, to the actuating extension arm 38 carried by the pivotally mounted shaft 39 controlled from steering wheel 36.

The above tractor constructions are shown more or less diagrammatically since they are supplied by various tractor manufacturers and differ only in immaterial details.

In the reconstruction of the tractor, in accordance with the present invention, the front wheels and their supports are removed, together with the wheel steering linkage, retaining only the extension arm 38 on shaft 39 for a purpose described below. There is installed instead, at the forward portion of the tractor frame, a supporting frame indicated generally at 40, formed of hollow longitudinal beams 42 attached to the tractor frame at spaced points thereon. These beams are of rectangular shape, preferably formed of two inwardly facing channel irons with the edges of side flanges welded together to form the upper and lower surfaces as shown. The rearward ends of beams 42 are secured to vertical angle brackets 43 as by welding. The lower ends of brackets 43 are bolted securely to a bottom transverse supporting beam 44, shown as a rugged inverted U-beam, extending across beneath the tractor and bolted centrally to a tapped bottom surface 45 formed on the tractor frame disclosed. The upper projecting ends of brackets 43 may be further reenforced with respect to one another, where space is available on the tractor, by a cross bar 46, bolted at its ends to the upper portions of brackets 43. The forward ends of longitudinal beams 42 are secured to vertically extending plates 47, shown as welded on the inner faces of beams 42 and bolted at their upper ends to corresponding tapped vertical surfaces 48 available on opposite sides of the tractor frame, above and substantially in advance of the tapped under surface 45 (see FIG. 5). The front end of frame 40 may be further reenforced by a lower cross bar 49, securely bolted at its ends to lower projections from plates 47. The frame 40 is thus rigidly and fixedly connected at widely spaced points on the forward portion of the tractor frame 12 and is firmly braced to distribute the extreme stresses to which it is subjected in use.

The forward wheel supporting structures mounted on frame members 42 are identical but reversed on the two sides of the tractor. On each there is a rigid transverse outwardly extending beam 50, which may be formed of two vertical channel irons with the edges of the channels welded together, the inner end of each beam being welded at corresponding intermediate points on the outer surfaces of beams 42. The beams 50 are preferably reenforced by one or more diagonal strips 51 welded at their outer ends to extended portions of beams 50 and at their inner ends at spaced forward and rearward points on beams 42. Beams 50 each carry inner and outer downwardly extending vertical plates 52 and 53, facing one another and each welded respectively to the lower surface and to the ends of beams 50. The lower ends of plate 52 and 53 have openings, reinforced by exterior hollow steel bearing cylinders 54, welded to the plates 52 and 53 for receiving the ends of steel bearing shafts 55 keyed by transverse pins 56 to the aforesaid steel cylinders 54.

There are provided duplicate aligned longitudinal wheel supporting rocking beams 58 on each side of the tractor. Each beam 58 has an extended hub member 59 welded thereto and extending, with the thickness of beams 58, substantially from plates 52 to plate 53. Beams 58 are supported for rocking movement on said transverse bearing shafts 55. The beams 58 carry extended cylindrical hub members 59 welded thereto and are preferably reenforced, to assure their relation to transverse shafts 55, by one or more diagonal webs 60 welded across between beams 58 and hub members 59.

The rearward hubs 62, for carrying rear supporting wheels 63 are mounted on the outer surface of hinged beams 58, each such outer surface preferably being reenforced by steel plates 64 welded thereto to afford a reenforced support for the wheels 63. The forward end of each beam 58 is provided with a slightly larger correspondingly shaped extension beam 65, fitted snugly over the forward end of each hinged beam 58. The axles 66 for the forward supporting wheels 67 are mounted on the forward portion of extension beams 65, suitable reenforced by similar metal plates 64, welded thereto. It will be noted the axis of rotation of wheels 63 and 67 are in substantial alignment with the rocking axis at 55 of beams 58 on both sides of the tractor.

It is necessary that the center of the tread of all of the wheels on each side of the tractor be carefully aligned to support the endless tracks 68 which are mounted over the driving wheels and over the two aligned supporting wheels on each side of the tractor. These tracks are of standard commercial construction, with a series of transverse tread sections 69, connected by rugged hinged links 70 adjacent the ends of the treads. The treads are dished inwardly to assure their maintenance on the wheels and are provided with the usual outer anti-skid cleats and the inner rounded projections, not shown, between which the treads of the smaller supporting wheels ride. These projections and the outer anti-skid cleats assure that the tracks move over the ground with the driving wheels and supporting wheels as the tractor is operated.

Adjustment of the wheels, for proper mounting of the endless tracks, is provided by lengthwise adjustment of the extension beams 65. As shown, each hinged side beam 58 carries an internally threaded lug 71 welded thereon and a rotatable adjustment bolt 72, correspondingly externally threaded, and a rearward out-of-round operating head whereby the bolts 72 can be turned for lengthwise adjustment. The forward ends of bolts 72 bear against upstanding lugs 73 mounted rigidly on and projecting above extension beams 65. Rotation of bolts 72 places the corresponding extension beam 65 under proper tension. When correctly adjusted, the extension beams may be secured firmly in position by adjustable locking bolts 74 on one or more surfaces of the beams. The bolts 74 have screw threaded engagement with the extension beams 65 and are engageable when turned inwardly against or into the exterior surface of the corresponding beam 58. Reenforcing nuts 75 are preferably first welded over the side openings in extension beams 65, before they are tapped, to assure a sufficient internally threaded surface for firmly holding the bolts 74.

It is of especial advantage to have more of the forward weight of the tractor borne by the rearward supporting wheels 63 than by the forward supporting wheels 67 to facilitate steering of the tractor under all conditions and passage over obstructions in the path of the tractor. This is accomplished by placing the tilting axis for the beams 58 a shorter distance $a$ from the axis of rotation of the rear wheels 63 than the distance $b$ from the axis of rotation of the forward supporting wheels 67. While the distances $a$ and $b$ may be varied considerably due to differences in the length of the tractor and are affected by longitudinal adjustment of the forward supporting wheels for track adjustment, it has been found that a ratio of approximately 3 to 2 for the distances $b$ and $a$ is generally satisfactory.

Application of the brakes individually or together to the driving wheels 14 and 16 may be accomplished by actuation of either one or both brakes through foot pedals 27 and 28, as stated above. However, there is often considerable advantage in controlling braking of the driving wheels individually from the steering wheel 36. For this purpose in the present tractor, the brake operating arms 30 and 34 are coupled respectively to right and left longitudinal chains 76 and 78 by suitable clevises as shown. Supporting brackets 80 and 82 are hingedly mounted, for oscillation on vertical axes, on rigid side plates 47 referred to above. These brackets are formed with outstanding arms 84 and 86 connected respectively with control chains 76 and 78 and with actuating arms 88 and 90 pivotally connected to links 91 and 92, respectively, with the links connected at their inner ends by pin 93. The link 91 is formed with a screw threaded adjustable end portion 94, for adjustment with respect to the length of link 91, and with an orifice in the extended end thereof mounted on the actuating arm 38 controlled by the steering wheel 36. Link 92 may have a screw threaded portion for adjustment of the length thereof, as shown at 98 for link 91.

Rotary movement of the steering wheel 36 to the right moves the free end of the steering extension 38 to the left, drawing brake chain 76 forwardly and applying the right brake at 18 more or less firmly as desired. Similarly, rotation of the steering wheel 36 to the left causes application of the left brake at 19, through opposite movement of the steering link 38.

The operation of the tractor will be clear from the above description. When the tractor moves forwardly or rearwardly the endless tracks provide a full length of gripping surface for the tractor. When stones or other obstructions are encountered either of the forward supporting wheels 67 may be elevated independently of the other. After the obstruction is passed the advance wheels 67 may become lowered and one or both of the rearward supporting wheels 63 elevated, as shown in FIG. 1. Obstructions thus present no serious impediment to travel or danger of upsetting the tractor. The actual driving devices, that is, the endless tracks have a relatively long ground contact, compared with other tractors, resulting in greater stability of the tractor in difficult situations, such as irregular or sloping terrain.

The placing of the transverse rocking axes for the hinged beams 58, nearer the axis of the rearward supporting wheels than that of the leading supporting wheels, is of especial advantage. The tractor can be more easily steered by braking one or the other rear wheel since the driving wheels and forward supporting wheels skid more readily in making a turn.

The extra pair of supporting wheels within the endless tracks divided the weight over a greater number of wheels, with less wear on individual wheels. This is accomplished without transmitting abnormal tension to the endless tracks or wheels. As one forward supporting wheel moves upwardly, for example, when it encounters an obstruction, the corresponding rearward supporting wheel moves downwardly, thereby maintaining approximately the same tension on the track at all times. This is equally true where one of the rearward supporting wheels is passing over an obstruction and the corresponding forward supporting wheel becomes lowered.

Having now described my invention, I claim:

1. In a tractor provided with a frame carrying a source of power, a pair of spaced rear driving wheels, one at each side of said tractor, said wheels having exterior tread portions and motivated from said source of power, and independently actuated brakes for each of said driving wheels, the combination of a forward support for said tractor frame, said forward support comprising a supporting frame securely and rigidly attached to said tractor frame forwardly of said rear driving wheels, corresponding longitudinal wheel supporting beams, pivotally mounted on each side of said supporting frame on fixed aligned transverse axes at intermediate points on said beams for independent rocking movement of said wheel supporting beams on said supporting frame, forward and rearward supporting wheels formed with tread portions and pivotally mounted on transverse axes on each of said beams at forward and rearward points thereon, in advance of and to the rear of the aforesaid aligned rocking axes of said beams, respectively, the tread portions of the wheels mounted on each of said beams being aligned longitudinally with one another and with the tread portion of the corresponding rear driving wheel for all conditions of normal operations, and endless track treads mounted over the forward and rearward supporting wheels and rear driving wheel at each side of said tractor.

2. The tractor recited in claim 1, wherein the horizontal distance from the rocking axes of said wheel supporting beams to the axes of rotation of said forward supporting wheels is greater than the distance between said rocking axes and the axes of rotation of said rearward supporting wheels.

3. A tractor comprising a frame, a power unit, rearward driving wheels, formed with exterior tread portions, mounted on said frame, means including a differential mechanism for connecting said power unit to said driving wheels for driving the same, a forward support for said tractor, comprising fixed supporting beams rigidly secured to said tractor frame, one on each side thereof, longitudinal wheel beams, one on each side of said tractor, means for hingedly connecting each said wheel beam independently to one of said fixed supporting beams on the same side of said tractor frame for independent rocking movement of each of said wheel beams on aligned axes, transverse to the length of said wheel beams and at aligned intermediate points thereon, a pair of longitudinally spaced front and rear supporting wheels on each side of said tractor, formed with exterior tread portions, means for mounting said wheels on said wheel beams on each side of said tractor for rotation on parallel transverse axes, one in advance of the other, the axis on which said hinged wheel beams rock being substantially aligned with the axes of rotation of both said supporting wheels on the same side of the tractor and closer horizontally to the axis of rotation of the rearward supporting wheels than to the axis of rotation of the forward supporting wheels, on each side of the tractor, said supporting wheels on each side of the tractor having said tread portions aligned with one another and with the tread portion of said driving wheels on the same side of said tractor, each side of said tractor being supported on said driving wheel and on said pair of aligned, hingedly supported supporting wheels, and endless tracks, each mounted on the driving wheel and on the two aligned supporting wheels on the same side of said tractor on which said tractor travels.

4. In a tractor having a frame provided with right and left rearward driving wheels, each formed with a tread portion, a source of power, a differential mechanism connecting said source of power with said driving wheels and individual brakes for each of said driving wheels, the combination of a forward supporting structure fixedly mounted on said frame, rocking beams hingedly mounted on said supporting structure for independent rocking movement on aligned transverse horizontal axes, one such beam on each side of said tractor, forward right and left supporting wheels mounted forwardly on each side of said supporting structure, said supporting wheels on each side having tread portions aligned with the tread portion of the corresponding driving wheel under all operating conditions, operating means on said tractor for applying either or both of said brakes, a separate manual steering device mounted on said tractor adjacent said brake operating means and movable selectively in opposite directions, means for applying one of said brakes when said manual steering device is moved in one direction and for applying the other of said brakes when said steering device is moved in the other direction and flexible endless tracks each mounted over the rearward driving wheels and forward supporting wheels on each side thereof on which said tractor travels.

5. The tractor recited in claim 4, wherein said supporting wheels extend forwardly to a position in advance of said tractor frame and means for mounting said supporting wheels on said tractor frame for vertical movement on a horizontal axis fixed with respect to said frame and cooperating means for maintaining said tracks under substantially the same degree of tautness during normal up or down vertical movement of said forward supporting wheels with respect to said frame as said tractor travels.

6. In a tractor provided with a frame and with axially aligned rearward driving wheels mounted on said frame, a differential driving mechanism for said wheels, a power unit for driving said wheels through said differential mechanism, individual brakes for said driving wheels, a forward support for the frame of said tractor comprising a framework rigidly connected to said frame at a lower rearward point and at forward spaced points on said frame higher on said frame than the aforesaid lower rearward attachment point, longitudinal beams individually mounted by means of aligned transverse bearings supported on said rigid framework for rocking movement of said longitudinal beams on fixed aligned horizontal axes intermediate the ends thereof, two rotatable supporting wheels mounted on each of said longitudinal beams, one forwardly of, the other rearwardly of, the rocking axes of said longitudinal beams, said forward and rearward supporting wheels and said rearward driving wheels being aligned on each side of the tractor during all normal operations of said tractor, flexible endless tracks at each side of said tractor, mounted over the aforesaid two supporting wheels and driving wheel at each side of the tractor, brake control means for applying either or both of said brakes and supplemental brake control means, controlled by said steering wheel for applying one or the other of said brakes.

7. A conversion construction for tractors formed with a frame, rear driving wheels having tread portions, a power unit connected by a differential mechanism with said driving wheels, a steering wheel and a hinged extension arm controlled thereby and a rugged supporting frame, comprising, in combination, longitudinal beams secured firmly to forward and rearward portions of said tractor frame and extending longitudinally at each side of said tractor frame, outwardly extending beams rigidly secured to each of said longitudinal beams, extending outwardly to positions aligned with the tread portions of said rear driving wheels, reenforcing struts secured to the free ends of said outwardly extending beams and extending diagonally to and secured adjacent the ends of said longitudinal beams for reenforcing said outwardly extending beams, spaced vertical wheel supporting plates secured rigidly to and extending downwardly in pairs for the outer portions of each of said outwardly extending beams, the lower ends of said plates provided with horizontal aligned bushings, a supporting shaft mounted in the said bushings in the free ends of each pair of said downwardly extending plates, wheel supporting beams mounted for rocking movement on aligned transverse axes on said shafts, reenforcing hub members mounted for rotation on said shafts and secured to said wheel supporting beams with said hub members and beams substantially filling the space between each said pair of wheel supporting plates, an adjustable extension beam mounted on the forward end of each said wheel supporting beam, means for adjusting said extension beams with respect to said wheel supporting beams, forward and rearward rotatable supporting wheels on each side of said tractor, means for supporting said forward wheels on said extension beams and said rearward supporting wheels on the rearward portion of said wheel supporting beams, each said supporting wheel including a tread portion aligned with the tread of the rear driving wheel on the same side of said tractor and flexible endless tracks mounted on the driving wheel and on the two supporting wheels at each side of said tractor.

References Cited by the Examiner

UNITED STATES PATENTS

| 2,698,667 | 1/55 | Kropp | 305—24 |
| 2,891,821 | 6/59 | Mayr | 305—22 X |

FOREIGN PATENTS

| 758,938 | 10/56 | Great Britain. |

ARTHUR L. LA POINT, *Primary Examiner.*